United States Patent Office.

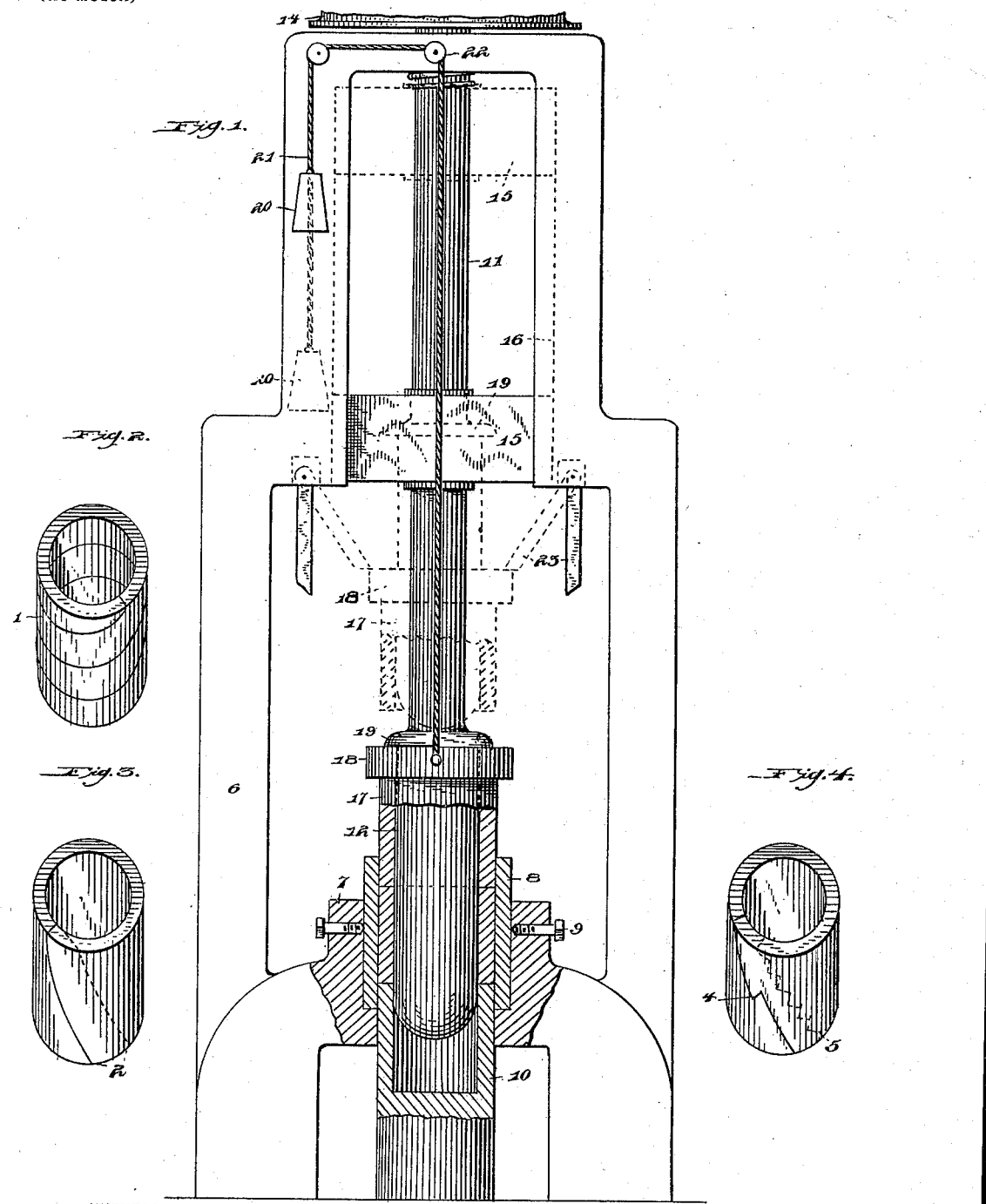

ALBERT G. HEINLE, OF McKEE'S ROCKS, PENNSYLVANIA, ASSIGNOR OF ONE-FOURTH TO JOHN SCHMID, OF SAME PLACE.

SOCKET-WELDING MACHINE.

SPECIFICATION forming part of Letters Patent No. 635,097, dated October 17, 1899.

Application filed June 28, 1899. Serial No. 722,158. (No model.)

*To all whom it may concern:*

Be it known that I, ALBERT G. HEINLE, a citizen of the United States of America, residing at McKee's Rocks, in the county of Allegheny and State of Pennsylvania, have invented certain new and useful Improvements in Devices for Making Sockets, of which the following is a specification, reference being had therein to the accompanying drawings.

This invention relates to certain new and useful improvements in socket-machines, and has for its object to construct a machine for the welding of all forms of sockets, such as are used in the connection of pipes and the like.

The main object of my invention is to provide a device for welding sockets by applying the welding pressure to the ends of the sockets in order to secure a more efficient weld.

So far as I am aware the welding of sockets at the present time has generally been accomplished by applying the welding pressure to the exterior surface or periphery of the socket, and it is at all times difficult to secure an absolutely certain weld. In my invention the socket is held within a suitable die, and having been cut on a bias or at an angle at its ends the pressure is applied direct to the ends of the socket and the meeting edges forced into firm engagement with each other and welded together.

Briefly described, my invention consists of a suitable frame having a die-stand adapted to receive variable-sized dies, with a vertical operating plunger-rod and mandrel, together with means for operating the rod, so as to apply the pressure to the ends of the socket for welding, and means for removing the socket from the mandrel after it has been welded.

My invention finally consists in the novel combination and arrangement of parts to be hereinafter more fully described and then specifically pointed out in the claim.

In describing the invention in detail reference is had to the accompanying drawings, forming a part of this specification, and wherein like numerals of reference indicate corresponding parts throughout the several views thereof, and in which—

Figure 1 is a front view of my improved socket-machine, partly in section, showing the socket therein in position to be welded and showing the movement of the parts at different lines. Figs. 2, 3, and 4 are detail perspective views of sockets, illustrating in full and dotted lines the different manners in which the sockets may be cut on a bias or at an angle to the ends, so as to effect a perfect weld by the use of my apparatus.

The strip of hot material from which the socket is formed is wound upon a mandrel, cut to the desired length by shears or other suitable means in the ordinary manner, the socket being cylindrical in shape before being placed in the machine for being welded. The welding edges of the sockets are preferably cut at a bias, which is shown on the socket 1 in Fig. 2 of the drawings, and extends spirally around the same, or, as shown in Fig. 3, the cut 2 may extend at an angle as shown in full lines or at that shown in dotted lines, while in Fig. 4 I illustrate a socket having shoulders 4 formed on the welding edges in full lines and an irregular welding edge 5, as shown in dotted lines in this view. These different forms of cutting the edges have been shown to more clearly illustrate how the pressure applied to the ends of the sockets will effect a perfect weld.

Referring now to Fig. 1 of the drawings, 6 indicates a suitable frame or housing having arranged therein a die-stand 7, adapted to receive a die 8, which may be secured therein and arranged centrally, so as to be in position to receive the mandrel by means of the set-screws 9. Arranged at the base of the housing and extending upwardly into the die-stand 7 is a suitable receiving-head 10, which, if desired, may be connected to an operating-cylinder or the like, in order that, if desired, the finished socket may be removed from beneath the die-stand. In the accompanying drawings, however, I show a device constructed so as to remove the socket from the mandrel at a point above the die and die-stand.

The socket after having been cut on a bias or at an angle, as heretofore stated, is placed within the die 8 and is supported by reason of its lower end resting against the end of the receiving-head 10. For welding the socket when thus placed in position I provide a vertically-moving shaft or plunger 11, carrying on its lower end a mandrel 12 and operating through the upper end of the housing 6. This shaft or plunger may be operated by connections with a cylinder 14, as shown, or in any desired manner. The shaft or plunger 11 has arranged thereon a sliding cross-head 15, operating in suitable guides 16, provided therefor in the housing.

The mandrel 12 has arranged thereon a welding-sleeve 17, having at its upper end an enlarged band or flange 18, which abuts against the head 19, formed on the plunger or shaft 11 at its intersection with the mandrel. The cross-head 15 is recessed on its underneath face, so as to receive this flange-head 19 upon the upward movement of the shaft or plunger 11, as is shown in dotted lines in Fig. 1. A counterbalance-weight 20 is attached to the flange 18 by a cord or cable 21, passing over pulleys 22, arranged on the side of the housing.

In order to limit the upward movement of the welding-sleeve when the mandrel and shaft are being elevated, and thereby cause this welding-sleeve to remove the welded socket from the mandrel, I pivotally secure in the housing 6 a pair of arms 23, which when moved into the position shown in dotted lines in Fig. 1 of the drawings engage the flange or band 18 and arrest the movement of the same, while permitting the shaft to continue its movement to the position as shown in dotted lines and causing the welding-sleeve to force the completed socket from the mandrel.

When making different-sized sockets, it is customary to provide a series of dies having the same diameter and with cores of variable diameters. By this means the die-stand 7 will accommodate all the dies. When the socket has been placed in position in its die, the shaft or plunger 11 is moved downwardly by power applied through the cylinder 14, and, the lower end of the welding-sleeve 17 coming in contact with the upper end of the socket, pressure applied thereby causes the welding edges of the socket to be firmly secured together. Upon the reversing of the operating mechanism and withdrawal of the mandrel the welded socket, by reason of the contraction, will be retained on the mandrel, so as to be drawn out of the die, and during this upward movement of the mandrel the arms 23 are moved so as to be in position to engage the flange 18 and arrest the movement of the welding-sleeve, causing the removal of the socket from the mandrel. Another socket may then be placed in position on the die, the operating mechanism reversed, and the socket welded, as heretofore described.

Having thus fully described my invention, what I claim as new, and desire to secure by Letters Patent, is—

In an apparatus of the class described, the combination with a housing having a die-stand arranged at the lower portion thereof, of a die removably secured in said stand, a stationary receiving-head projecting upwardly into the lower part of said die-stand and forming a support for a socket, a vertically-reciprocating plunger operating in said housing and having an enlarged head at its lower end, operating means for the said plunger, a mandrel of less diameter than the said head formed integral therewith, a welding-sleeve surrounding the said mandrel, an enlarged band or flange formed integral with the upper end of said sleeve and adapted to engage the said head, means for retaining said welding-sleeve in an elevated position, and a pair of pivoted arms secured to the said housing and adapted to engage the said band or flange to arrest the movement of the welding-sleeve and remove the socket from the mandrel during the upward movement of the plunger, substantially as described.

In testimony whereof I affix my signature in the presence of two witnesses.

ALBERT G. HEINLE.

Witnesses:
JOHN NOLAND,
H. H. PATTERSON.